(12) United States Patent
Staub et al.

(10) Patent No.: US 6,359,734 B1
(45) Date of Patent: *Mar. 19, 2002

(54) SURFACE PATTERN

(75) Inventors: René Staub, Cham; Wayne Robert Tompkin, Baden, both of (CH)

(73) Assignee: OVD Kinegram AG, Zug (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/090,281

(22) Filed: Jun. 4, 1998

(30) Foreign Application Priority Data

Jun. 6, 1997 (CH) .............................................. 1368/97

(51) Int. Cl.[7] ................................................ G02B 5/18
(52) U.S. Cl. ...................... 359/572; 359/566; 359/567; 359/569; 359/573
(58) Field of Search ................................. 359/566, 567, 359/569, 571, 572, 573, 2

(56) References Cited

U.S. PATENT DOCUMENTS

| | | | | |
|---|---|---|---|---|
| 3,917,378 A | * | 11/1975 | Gale .......................... | 359/566 |
| 4,023,010 A | * | 5/1977 | Horst et al. ................. | 359/569 |
| 4,568,141 A | | 2/1986 | Antes .......................... | 359/2 |
| 4,984,824 A | | 1/1991 | Antes et al. ................. | 283/91 |
| 5,032,003 A | * | 7/1991 | Antes .......................... | 359/567 |
| 5,101,184 A | * | 3/1992 | Antes .......................... | 235/454 |
| 5,104,471 A | | 4/1992 | Antes et al. ................. | 156/233 |
| 5,379,131 A | | 1/1995 | Yamazaki ..................... | 359/2 |
| 5,450,378 A | * | 9/1995 | Hekker ........................ | 359/15 |
| 5,483,363 A | | 1/1996 | Holmes et al. .............. | 359/2 |
| 5,784,200 A | * | 7/1998 | Modegi ....................... | 359/567 |
| 5,825,547 A | | 10/1998 | Lee .............................. | 359/567 |
| 5,841,555 A | * | 11/1998 | Bianco et al. ................ | 359/2 |
| 5,900,954 A | * | 5/1999 | Katz et al. ................... | 359/2 |
| 5,956,164 A | * | 9/1999 | Waitts ......................... | 359/2 |
| 5,969,863 A | | 10/1999 | Staub et al. ................. | 359/567 |

FOREIGN PATENT DOCUMENTS

| | | |
|---|---|---|
| DE | 297 00 289 U1 | 8/1997 |
| EP | 0 075 674 B1 | 12/1985 |
| EP | 0 537 439 A1 | 8/1992 |
| WO | WO 98/55963 | 12/1998 |

OTHER PUBLICATIONS

H.J. Caulfield, *Handbook of Optical Holography*, Academic Press, Inc., 1979, pp. 202–204.
H.J. Caulfield, *Handbook of Optical Holography*, Academic Press, Inc., 1979, pp. 228–229.

* cited by examiner

*Primary Examiner*—Audrey Chang
*Assistant Examiner*—Jennifer Winstedt (57) ABSTRACT

A surface pattern (1) has N visually recognizable patterns which are composed of optically diffractive, microscopically fine relief structures, plane mirror faces or absorbing or scattering structures. The N patterns share at least one independent common surface element (11). The surface element (11) is subdivided into surface parts and has an arrangement of the surface parts which is independent of the N patterns, which has a predetermined structure, and which is not recognizable to the naked eye. A single microscopically fine diffraction structure or a structure which has an absorbing or scattering property or is a plane mirror is applied to each surface part. The relief structures, diffraction structures and other structures are embedded in a plastic laminate (20) and can have their optical performance enhanced by a reflection layer (21). The surface pattern (1) is applied as a security element to a document (2) and allows the document (2) to be identified by machine in a reading machine.

50 Claims, 3 Drawing Sheets

SURFACE PATTERN

BACKGROUND OF THE INVENTION

The invention relates to a surface pattern made of diffractive structures embedded in a laminate or foil which may be attached to a substrate.

Surface patterns of this type are suitable as a security and authenticity feature on documents, for example bank notes, securities, identification documents, passports, credit cards and other identity cards, smart cards in every form, etc.

Patent applications EP-A 105,099, EP-A 330,738, EP-A 375,833 and EP-A 537,439 disclose optically diffractive security features, embossed in plastic and having N patterns and extremely fine filigree structures, for example guilloches, the visual content of which changes in a predetermined fashion when rotated about an axis. These security features lack machine-readable information.

Security features of this type are embedded in a plastic laminate (EP-A 401,466) and are intended for attaching to a substrate.

Further, volume holograms are known (H. J. Caulfield: "Handbook of Optical Holography", pages 202–204, 228–229, Academic Press, Inc., 1979, ISBN 0-12-165350-1). Starting with a light sensitive film or foil the hologram is generated by illumination by reference waves and object waves originating from a laser. The interference between the reference waves and object waves generates local variations of the index of refraction within the foil locally in form of closely staggered fringes within the thick and light sensitive layer. The film is practically transparent after the development of the film and at the same time the light entering the foil will be diffracted with a high efficiency by the fringes.

Swiss patent specification CH-PS 653,160 discloses a security document having machine-readable optical authenticity markings. The document has only the authenticity marking which consists of diffraction structures that are composed of joined-together sub-areas with predetermined diffraction structures. It is proposed to partition a coarse relief for a diffraction structure over a plurality of surface parts. However, the information content can easily become manipulated if the authenticity marking is cut up and joined back together again. One important feature is the simultaneous static detection of the information from the entire authenticity marking when the entire surface of the authenticity feature is illuminated with collimated light.

The security feature can have first-type diffraction elements, which according to EP-A 360,969 differ from the other diffraction elements which surround them only by their 180° greater azimuth value (asymmetry). With such mirror-symmetric pairs comprising the diffraction elements, it is possible to integrate an item of information into the authenticity feature. A surface pattern of this type has the same disadvantage as Swiss patent specification CH-PS 653,160.

SUMMARY OF THE INVENTION

The object of the invention is to provide a surface pattern in the form of an optically diffractive security feature, which has easily readable information for identifying the security feature concealed within the surface pattern and which is difficult or impossible to manipulate.

Said object is achieved according to the invention by adding an arrangement of surface parts to N visible surface patterns of the security feature. The arrangement is independent of the N surface patterns and has a predetermined structure made of its surface parts which is not visible to the unaided human eye. The area of each of the surface parts is covered by a single microscopically fine diffraction structure or by a structure having light absorbing or light scattering properties, or is a plane mirror. The information conveyed by the arrangement of the surface parts determines the different structures used within the arrangement.

Said surface pattern attached to document may be used as a security element which identifies the document in a reading machine.

Illustrative embodiments of the invention will be explained in more detail below with reference to the figures.

DETAILED DESCRIPTION OF THE INVENTION

Figure 1:
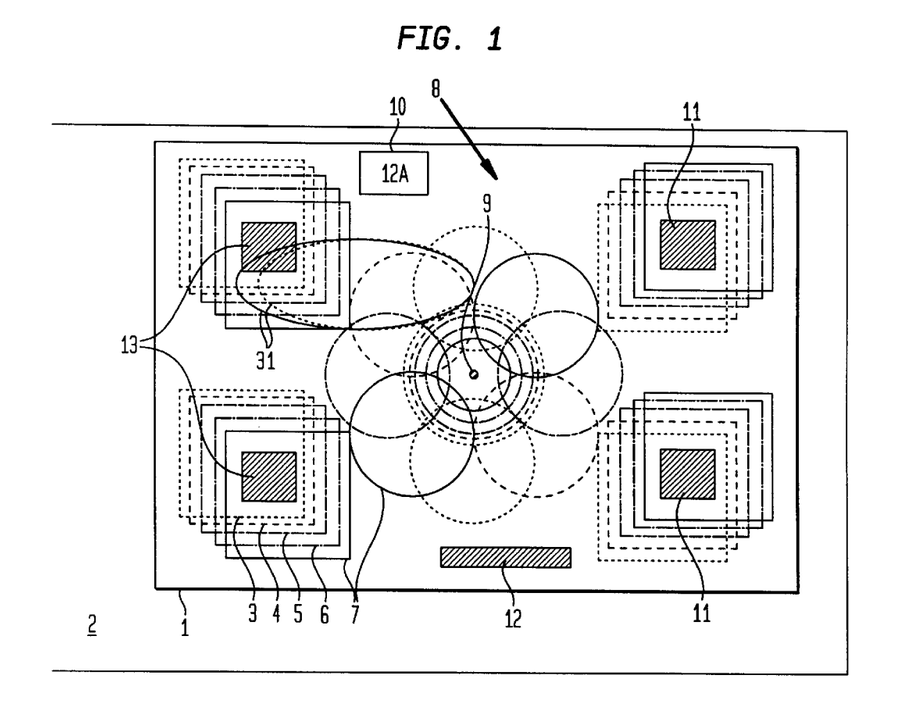
FIG. 1 shows a surface pattern

FIG. 1 shows a surface pattern 1 which is applied as a security element to a document 2. The surface pattern 1 has N visually recognizable patterns which are composed of surface portions or other graphical elements having optically diffractive, microscopically fine relief structures, plane mirror faces or absorbing or scattering structures. N is an integer >0, and N would be chosen between 6 and 30 for impressive optical motion effects. Embodiments of the N patterns are described in the patents EP-A 105,099, EP-A 330,738, EP-A 375,833 and EP-A 537,439 which have already been mentioned in the introduction. In the drawing in FIG. 1, for reasons of portrayal, the N patterns are represented by lines 3 to 7 in different configurations (by dots, dashes, dots and dashes, etc.). In reality, if an observer looks at the surface pattern 1 in a viewing direction 8, and the surface pattern 1 which is illuminated by daylight is rotated about the normal to the plane of the drawing (represented by a dot 9), he only sees one of the N patterns in brilliant colors at a time. In this example, on transition from one pattern to the next, the position of the squares and circles which can be seen on the surface pattern 1 changes, or circles of center 9 and varying radii can be seen in succession. Correspondingly configured text images 10 exhibit the same motion effects.

The N patterns share at least one independent common surface element 11 which is not part of the N patterns. A multiplicity of these surface elements 11 may be arranged next to one another, with or without spacing, and form a strip-like, linear first-type surface formation 12 having the height of a surface element 11. In another embodiment, a compact second surface formation 13 has the shape of a quadrilateral (square, rectangle, rhombus) or a different shape bounded in any desired way. Unconnected surface elements 11, bounded in any desired way, can be distributed over the entirety of the surface pattern 1 or be arranged in a loose group.

Figure 2A:
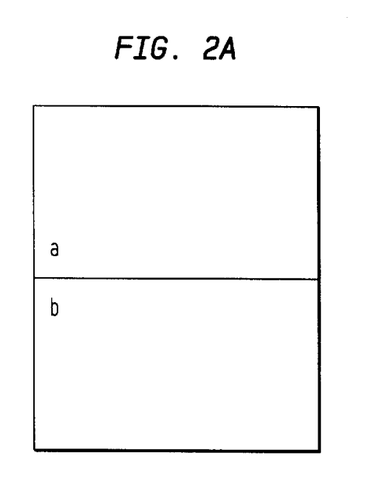
FIG. 2a–2d show surface elements

FIGS. 2a to 2d show examples of the surface elements 11; a point to note here being that the surface elements 11 shown are only drawn as rectangles for reasons of illustration. The surface element 11 is subdivided into surface parts 14, 15 and has an arrangement of the surface parts 14, 15 which is independent of the N patterns and has a predetermined structure, which is not recognizable to the naked eye, i.e. at least one dimension of the surface parts 14, 15 is less than 0.3 mm to 0.4 mm. A single microscopically fine diffraction structure, or a structure which has a light absorbing or scattering property or is a plane mirror, covers each surface part 14 or 15. The structures of the surface parts 14, 15, which are not specified in further detail, will be referred to below by the term "substructure". The surface element 11 in FIG. 2a is subdivided into two surface parts, 14, 15 of equal size. The substructure "a" is applied to the surface part 14, and the substructure "b" is applied to the surface part 15. The size of the surface element 11 is, for example, 0.5 mm in width and 0.6 to 0.8 mm in height. If a diffraction Structure is applied to them, and because of the high intensity of the light diffracted by the diffraction structure, these surface parts 14, 15 if covered with a diffractive structure are visible to an observer of the surface pattern 1 (FIG. 1) as conspicuous color spots and can degrade the visual impression of the presently visible pattern. Any damage to the surface of the surface element 1 inside the surface part 14 or 15 can considerably reduce the luminosity of the substructure.

Figure 2B:
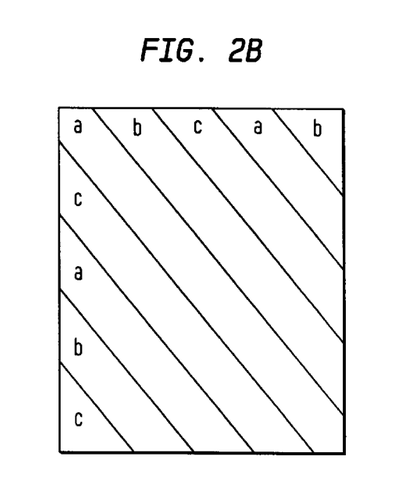
Figure 2C:
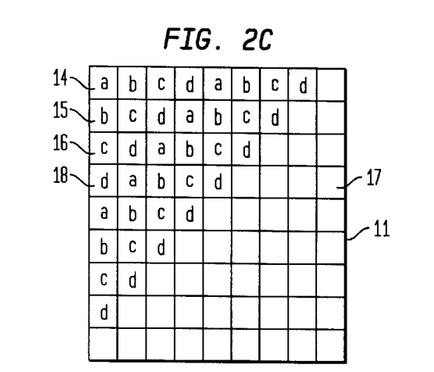
Figure 2D:
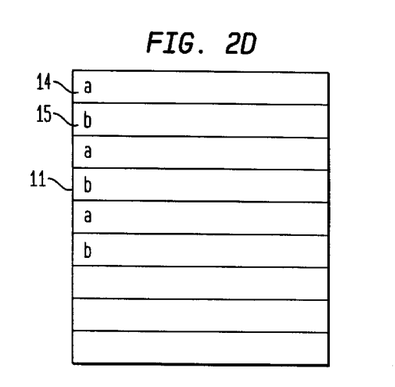

If the surface elements 11 are subdivided more finely, for example according to FIGS. 2b, 2c and 2d, the intensity of the surface element 11 is reduced for the observer. In FIG. 2b, the surface element 11 is subdivided with an arrangement of the obliquely positioned strip-shaped surface parts 14, 15 and 16. The substructures "a", "b" and "c" are assigned to the surface parts 14, 15 and 16, and form a cyclically alternating sequence: abc abc abc. The smaller dimension of the individual surface parts 14, 15 and 16 is of the order of 50 μm. If the substructures "a", "b" and "c" are designed as diffraction structures, they differ in at least one grating parameter, so that the observer usually sees a shade of mixed colors with a low brilliance. In FIG. 2c, the surface element 11 is subdivided into uniform pixels 17 whose largest dimension does not exceed 0.3 mm. This arrangement of the cyclically permuted substructures "a", "b", "c" and "d" in the surface parts 14, 15, 16 and 18 is a variant of the arrangement in FIG. 2b, which is easier to incorporate into one of the known surface patterns (EP-A 375,833). FIG. 2d shows an arrangement of the striped, at least 30 μm wide surface parts 14, 15 with the two cyclically permuted substructures "a" and "b". The examples shown here for the arrangement of the substructures in the surface element 11, and the manner of the subdivision of the surface element 11 are non-exhaustive.

Figure 3:
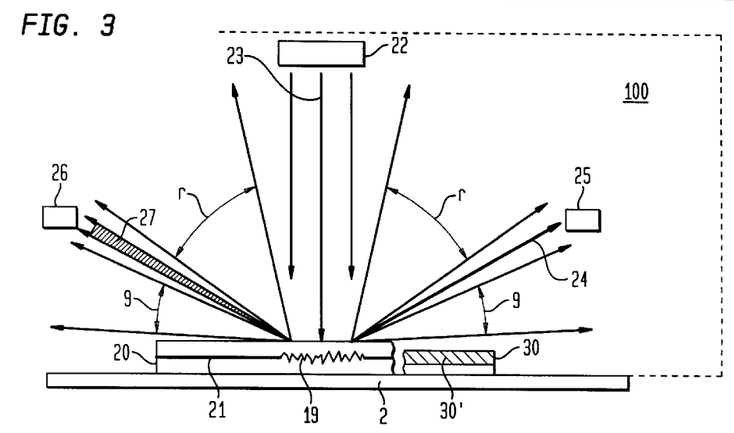
FIG. 3 shows a reading machine and the surface pattern

In FIG. 3, the surface pattern 1 (FIG. 1) is bonded to the document 2 using an adhesive layer between the laminate 20 and the document 2. A relief 19 of the surface pattern 1 having the N patterns comprises the surface portions having the microscopically fine relief structures or having light absorbing or light scattering structures or having plane mirrors, and the substructures of the surface elements 11. The relief 19 is embedded in a transparent plastic laminate 20. The relief 19 may be covered with a reflection layer 21 in order to improve the optical performance.

In another execution the area of the surface element 11 is embossed with a relief 19 having a superposition of at least two diffracting gratings known from WO 97/27504 instead of the fine division into the substructures 14 (FIG. 2a), 15 (FIG. 2a), 16 (FIG. 2b). The relief 19 being a superposition of simple linear gratings has the same characteristics as the surface element 11 divided into the substructures 14, 15, 16 each embossed by one of the simple linear gratings.

In another execution volume holograms 30 mentioned in the introduction are used as a similar surface patterns 1 instead of the embossed relief 19 resulting in the thus completely identical surface patterns 1. The volume holograms 30 are produced one by one; this technique may be used for the production of individual security devices having individual information to be recognized by a reading machine. The volume hologram 30 is recorded in a, compared to the wavelength of the recording light, thick light sensitive layer as a pattern of interference fringes generated by coherent reference waves and object waves. After the development of the illuminated light sensitive layer, the "foil", the fringes are recorded as local variations of the index of refraction within the material of the foil. The fringes act as the diffracting structure 30'. Since no reflection layer is used the volume hologram 30 is inherently transparent. This execution has the advantage that after attaching the volume hologram 30 to a document 2 by means of a transparent adhesive layer any picture, text, and/or other indicia on the surface of the document 2 arranged,ed below the volume hologram 30 are visible through the volume hologram 30.

By recording the pattern of interference under different conditions of illumination, several systems of fringes are generated as the structure 30 of the volume hologram 30 diffracting light analogously to one of the superpositioned gratings mentioned in WO 97/27504.

Machine identification of the document 2 in a reading machine described by the Swiss application 1397/97 which has the same priority and inventor as the present application, is advantageous especially with bank notes and identification documents of all kinds. In order to permit reliable optical reading by the reading machine, the diffraction structures of the surface elements 11 (FIG. 1) and the surface formations 12 (FIG. 1), 13 (FIG. 1) composed of the latter have at least one spatial frequency $f_B$ which is not used in the microscopically fine relief structures of the N patterns or is an integer multiple of the spatial frequencies $f_R$ used for the relief structures, that is to say the spatial frequency $f_B \neq m \cdot f_R$ for m=1, 2, 3, . . . ; the number m is the order of diffraction. If diffracted light of the k-th diffraction order is detected in the reading machine, then the selection of the spatial frequency $f_B$ is further restricted, since the exclusion rule $k \cdot f_B \neq m \cdot f_R$ for m=1, 2, 3, . . . and k=1, 2, . . . must also be satisfied for this k-th diffraction order. The spatial frequencies $f_B$ and $f_R$ are in the range from 0 to about 3500 lines/mm, that is to say from a plane mirror to grating structures which can only just be formed into the plastic of the laminate 20. It is conceivable, further to the use of separate spatial frequencies $f_B$ and $f_R$, to provide separate azimuthal ranges $\phi_B$, $\phi_R$ for the diffraction structures of the surface elements 11 and for the diffraction structures of the N patterns.

In the reading machine, a light source 22 produces monochromatic light 23 having a predetermined wavelength belonging to the infrared or visible range of the electromagnetic wave spectrum. The light 23 incident on the surface pattern 1 is diffracted on the many surface parts 14 (FIG. 2), 15 (FIG. 2), 16 (FIG. 2), 18 (FIG. 2) having the diffraction structures of the spatial frequency $f_B$; in this example, in the first diffraction order (m=1). In FIG. 3, an arrow 24 indicates the direction of the light, of wavelength λ, diffracted on the diffraction structures. The diffraction structures of the surface parts 14, 15, 16, 18 can differ by the azimuth φ (0°≦φ<360°) and by the profile of the diffraction structure (symmetrical and asymmetrical gratings, sinusoidal, rectangular, triangular or sawtooth profile with $(f_B)^{-1} \leq 3 \cdot \lambda$ or $(f_B)^{-1} > 3 \cdot \lambda$). The light diffracted on the surface parts 14, 15, 16, 18 of the diffraction structure which have the same azimuth φ is deviated symmetrically with respect to the incident light 23 and is incident on the photodetectors 25, 26. The incident light 23 and the two photodetectors 25, 26 which are arranged symmetrically with respect to the incident light 23, define a diffraction plane 100 having the azimuth Θ which is established by the surface parts 14, 15, 16, 18 to be detected. This plane 100 coincides with the plane of the drawing in FIG. 3.

The relief structures of the N patterns have different spatial frequencies and, for each pattern, a different azimuth, so that incident light 23 diffracted by the N patterns is deviated in different angular ranges Γ,θ, bounded by conical surfaces, and does not reach the photodetectors 25, 26. These conical surfaces have as common axis the direction of the zeroth diffraction order; in the drawing in FIG. 3, this axis is in opposite direction to the incident light 23.

For the same azimuth Θ (0°≦Θ<180°) of the diffraction plane 100 to which a substructure is assigned, the reading machine in the above mentioned Swiss application is able to discriminate between at least three states of the diffracted light, namely diffraction by a symmetrical grating or by one of the two asymmetric gratings having the azimuths φ and φ+180°. If, however, the substructure has a light absorbing or light scattering property, or if it is a plane mirror, then an additional, "no diffraction structure" state is recognizable to the reading machine. The surface parts 14, 15, 16, 18 having the same substructure therefore define at least four states. If, for example, the surface element 11 (FIG. 1) contains surface parts 14, 15 having two different substructures "a" and "b" (FIGS. 2a, 2d), then 16 different states can be represented with the surface element 11 which serves as the information element. It should be added that, in this case, two photodetectors 25, 26 each should be assigned in the two diffraction planes 100 in the reading machine, in accordance with the parameters of the two substructures "a" and "b". Using the information elements, the identity of the surface pattern 1 of a document 2 can be encoded and reliably recognized using the reading machine. If, in a surface element 11, T denotes the number of different substructures which are used in the surface parts 14, 15, 16, 18 and each substructure may define the Z states, the surface element 11 has, as an information element, E different states The advantage of this arrangement resides in the virtual impossibility of mechanically separating the surface parts 14 and 15, and therefore prevents the risk of fraud by re-configured assembly of a surface element 11 from cuttings.

As can be seen from FIG. 3, the spatial frequency $f_B$ used in the substructure has at least a minimum spatial-frequency difference Δf from the spatial frequencies $f_R$ of the relief structures, this being represented by the arrow 24 in the gap between the two bounding conical surfaces of the two angular ranges Γ,θ. The spatial-frequency difference Δf is about Δf=20 to 100 lines/mm for a typical spatial frequency $f_B$, $f_R$ of 500 to 1000 lines/mm.

If the document 2 is a thin piece of paper, for example as in the case of bank notes, the laminate 20 follows the rough and often also creased surface of the paper. The light 23 is then locally no longer incident perpendicular to on the surface pattern 1, and the direction of the arrow 24 deviates from the intended direction, and may possibly no longer reach the photodetectors 25 or 26. In order to compensate for these effects, the spatial frequency $f_B$ of the diffraction structure within the surface part 14, 15, 16 or 18 has a modulation, that is to say the spatial frequency $f_B$ does not have a unique value but varies continuously or discontinuously within tight limits, for example between 500 lines/mm and 520 lines/mm for a nominal frequency of $f_R$=510 lines/mm. The diffracted light is no longer collimated but instead slightly divergent, as indicated by the shaded region 27. In order to ensure that the diffracted light received by the photodetectors 25, 26 does; actually originate from the substructures, the exclusion rule k·$f_B$≠m·$f_R$ must be satisfied for all spatial frequencies $f_B$ of the modulation range (bandwidth).

Figure 4:
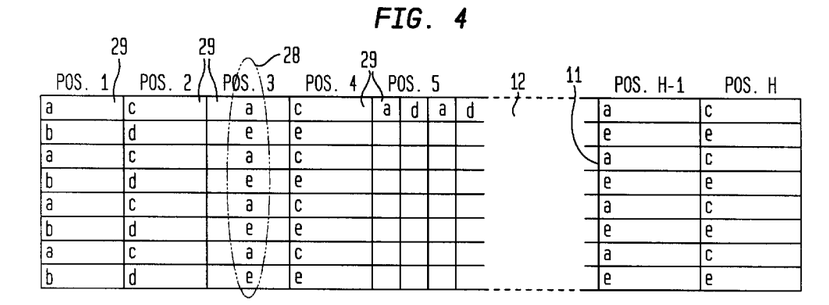
FIG. 4 shows a linear surface formation.

FIG. 4 represents an embodiment of the linear surface formation 12. In one example, the linear surface formation 12 is a sequence of the H successive surface elements 11. They have the arrangement of the surface parts 14, 15 which is shown in FIG. 2d, or an arrangement (Pos. 5) rotated through 90°. The parameters used in FIG. 4 for the substructures a to e are given in Table 1.

TABLE 1

| | Parameters of substructures | | | | |
|---|---|---|---|---|---|
| Substructure | a | b | c | d | e |
| Spatial frequency $f_B$ | 1000 per mm | mirror plane | 1000 per mm | 600 per mm | 600 per mm |
| Azimuth φ | 180° | — | 0° | 180° | 0° |
| Function | odd bit | start bit | even bit | logic 0 | logic 1 | where E=$Z^T$. If the surface formation 12 (FIG. 1) or 13 (FIG. 1) comprises a plurality of surface elements 11, for example, the number F, then $E^F$ different states of the information item are theoretically useable for encoding of the surface pattern 1 which can be read optically by the reading machine.

The light received by the photodetectors 25, 26 depends, amongst other things, on the total area of the surface parts 14 or 15 etc. having the same substructure within the surface element 11. In an example according to FIG. 2d, the dimension of the surface element 11 having two substructures was 0.5 mm in width and 1.2 mm in height, or 0.30 mm² for the total area of each substructure. The substructure was divided heightwise into 50 μm high surface parts 14, 15. This gave twelve surface parts 14 having the substructure "a" and equally many surface parts 15 having the substructure "b".

The substructures "a" and "c" indicate the surface elements 11 as being arranged in even and odd positions, respectively. The substructures "d" and "e" represent the information "logic 0" and "logic 1", respectively. Labelling the surface elements 11 with their position in the surface formation 12 has the advantage of substantially preventing manipulation of the information contained in the surface formation 12 by cutting up the surface formation 12 and re-assembling it differently.

The surface formation 12 must be optically scanned with a reading machine which reads sequentially, since the information also resides in the positional weight of the surface element 11, that is to say in its position relative to the start character (Pos. H=1). Going back to FIG. 3, the reading machine needs only a single diffraction plane 100, in which two pairs of photodetectors 25, 26 are arranged symmetrically with respect to the incident light 23. The light diffracted on the two substructures having the spatial frequencies 600 lines/mm and 1000 lines/mm then subdivides the half-space available for the diffracted light of the N patterns into three regions, rather than into two, as shown.

The incident light 23 is shaped using a collimator (EP-A 360,969) in such a way that, according to FIG. 4, an illuminated area 28 is produced on the surface element 11, for example, the dimension of which area along the surface formation 12 is equal to at least 50% of the width of a surface element 11. In order to read the information, the incident light 23 is scanned along the linear surface formation 12 in such a way that one surface element 11 is read after another. The start character permits unambiguous assignment of the information elements 29 in the surface formation 12. In this example, the linear surface formation 12 contains the information "Start/010 . . . 11". It is additionally possible for Pos. H to be configured as a stop character, the substructures "b" and "c" unambiguously signaling the stop character to the reading machine.

Figure 5:
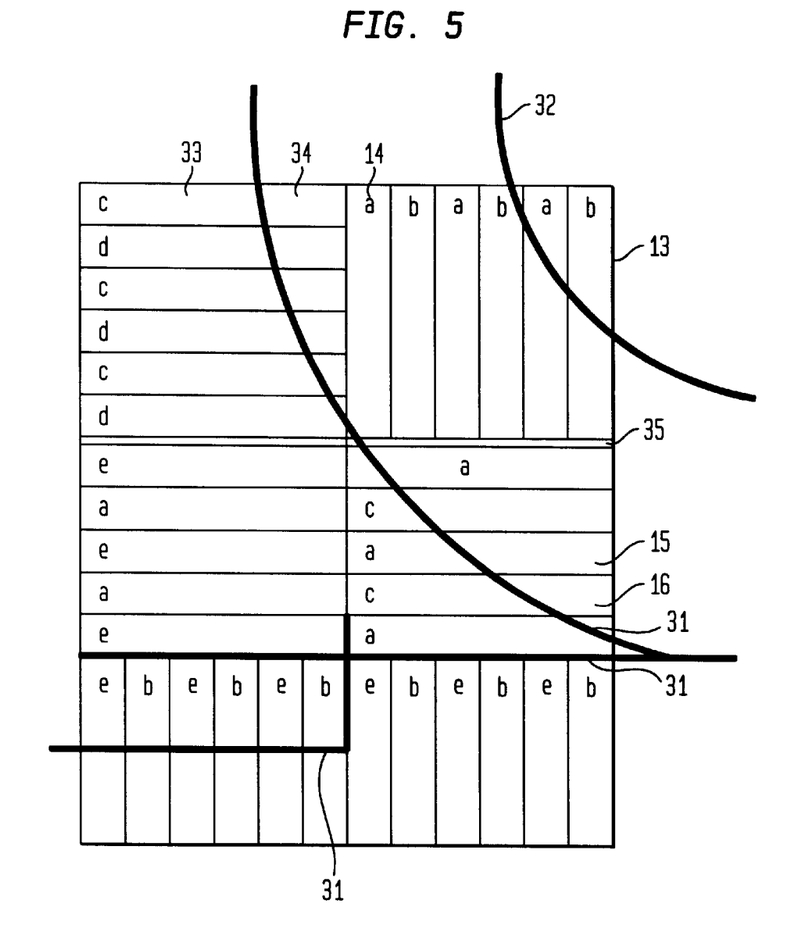
FIG. 5 shows a surface formation having a square boundary.

The compact second surface formation 13 (FIG. 1) is shown in FIG. 5 by way of example. The surface formation 13 is here composed of six surface elements 11 (FIG. 2d) which are subdivided with the arrangements of the surface parts 14 (FIG. 2d), 15 (FIG. 2d), and the five substructures being combined in the surface elements 11 to give {a, b}, {a, c}, {a, e}, {b, e} and {c, d}. Each substructure establishes one of at least four states. If the entire surface formation 13 is illuminated at once, a reading machine having three diffraction planes 100 (FIG. 3) and having five pairs of the photodetectors 25 (FIG. 3), 26 (FIG. 3) recognizes any given state out of $4^5=1024$ states which is defined by the choice of substructures. Table 2 contains the five parameters for a given single state as an example.

Figure 6:
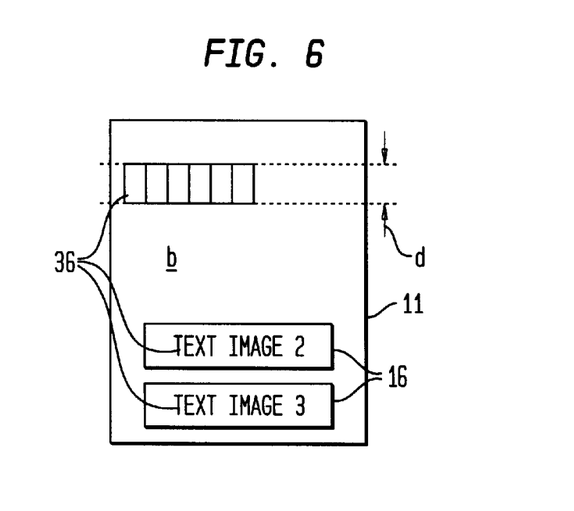
FIG. 6 shows an arrangement of text images in the surface pattern.

Without departing from the scope of the invention, graphical line elements 31, 32 of the N patterns may extend over the surface of the surface elements 11, and split it into the two sub-elements 33 and 34. The assignment to the surface element 11 is determined by the arrangement of the substructures. Contiguous surface elements may also be separated by a blank strip 35. Line elements 31, 32 of this type are usually extremely narrow (typically 30 to 100 $\mu$m) and therefore do not interfere with the reading of the surface elements 11 or, as shown by FIG. 1, of the surface formations 12, 13.

the character may have the sub-structure "b". In another embodiment, adjacent text images 36 and their background are separated by the surface part 16 having a third substructure "c".

The most important advantages of the encoding proposed here by means of a surface formation 12, 13 or a single surface element 11 are summarized again below;

Scratches, dirt, surface defects, etc. are then hardly noticeable since, without becoming overly conspicuous, the substructures carrying the information are distributed over a relatively large surface element 11.

The information is encoded exclusively with predetermined spatial frequencies $f_B$, so that the optical reading machine can easily read the information from the surface pattern 1.

A high degree of tolerance to errors in positioning the surface pattern 1 relative to the reading machine.

These and other modifications are possible, and the invention should not be limited to the specific embodiments discussed above. The true scope of the invention is to be found in the appended claims.

What is claimed is:

1. A surface pattern comprising:

N visually recognizable patterns of surface portions having optically diffractive, microscopically fine relief structures, plane mirror faces or having light absorbing or scattering structures, the optical performance of which is determined by a reflection layer on the structures;

at least one independent surface element sharing the N patterns and located within the N patterns;

surface parts subdividing said surface element in such a way that a predetermined structured arrangement of the surface parts within said at least one independent surface element which is independent of the N patterns, said arrangement of the surface parts is not recognizable to the naked eye, and wherein each of the surface parts contains one of at least two different substructures that is a microscopically fine diffraction structure, a structure having light absorbing or scattering properties, or is a plane mirror; and a plastic laminate in which the optically diffractive, microscopically fine relief structures, the plane mirror faces or the light absorbing or scattering structures of the N patterns and of said surface parts are embedded, the optical performance of which is determined by a reflection layer on the structures and the mirror faces, wherein in each said at least one independent surface element, the microscopically fine diffraction structures of the surface parts have at least one spatial frequency $f_B$, and the optically diffractive, micro-

TABLE 2

Example of a given single state defined by five parameters

| Substructures | a | b | c | d | e |
|---|---|---|---|---|---|
| Azimuthal angle of the diffraction plane | 0° | 90° | 0° | 90° | 135° |
| Azimuthal angle φ | 180° | 270° | 0° | — | 135° |
| Diffraction grating | asymmetric | asymmetric | symmetric | mirror | asymmetric |
| Spatial frequency $f_B$ | 600 per mm | 600 per mm | 900 per mm | 900 per mm | 900 per mm |

Instead of simple annular or linear strips, as shown in FIG. 6, a text image 36 consisting of alphanumeric characters may also advantageously be chosen for the surface parts 14, 15, 16, 17 and 18. Text images 36 of this type, having a height d≦0.3 mm, are described in EP-A 330,738. The alphanumeric characters of the text image 36 may, for example, have the substructure "a", and the background of scopically fine-relief structures of the N patterns have spatial frequencies $f_R$, and $k \cdot f_B \neq m \cdot f_R$ wherein k is the diffraction order of light diffracted by the surface parts to be detected in a reading machine and m is the order of diffraction of light diffracted by the N patterns.

2. The surface pattern according to claim 1, wherein:
each said at least one independent surface element is used as an information element which is optically readable by a reading machine; and
within each said at least one independent surface element, said surface parts having a same type sub-structure occupy an area, and areas of different sub-structures are of equal size.

3. The surface pattern according to claim 1, wherein each said at least one independent surface element is an information element, wherein a plurality of surface elements form a surface formation within the N patterns, and wherein each information element form a code which is optically readable by the reading machine.

4. The surface pattern according to claim 1, wherein said at least one independent surface element is an information element, wherein a plurality of surface elements form a surface formation within the N patterns, said surface elements are of equal size and arranged linearly in a surface formation, and wherein each information element form a code which is optically readable by the reading machine.

5. The surface pattern according to claim 1, wherein spatial frequencies $f_B$ used in each said at least one independent surface element has at least a spatial-frequency difference $\Delta f$ of 20 to 100 lines per mm from any of the spatial frequencies $f_R$ of the diffracting structures of the N patterns.

6. The surface pattern according to claim 1, wherein spatial frequencies $f_B$ of each said at least one independent surface element has a predetermined bandwidth.

7. The surface pattern according to claim 1, wherein said surface element is subdivided by a multiplicity of the surface parts into pixels or bands, and a group of at least two diffracting sub-structures are assigned to the pixels or bands to form a cyclically alternating sequence.

8. The surface pattern according to claim 1, wherein said surface element is subdivided by pairs of the surface parts into pixels or bands, and the two different diffracting structures of the pixels or bands are cyclically permuted.

9. The surface pattern according to claim 1, wherein at least one of the surface parts of said surface element is an alpha-numeric character or a line of text having a first sub-structure and is arranged on a background with a second sub-structure.

10. The surface pattern according to claim 1, wherein at least one of the N patterns comprises graphical elements and at least one of the graphical elements extends over said surface element and divides it into subelements.

11. The surface pattern according to claim 1, wherein the plastic laminate is bonded to a document by means of an adhesive layer, and wherein said at least one independent surface element serves as an information element which is used for identifying the document in the reading machine.

12. A surface pattern, comprising:
N visually perceptible patterns including surface portions with structures which are comprised of at least microscopically fine relief structures selected from the group consisting of structures having an optical-diffraction effect, planar mirror surfaces, absorbent structures and scattering structures;
at least one independent surface element located within the N patterns which is not part or the N patterns; surface parts subdividing said surface element in such a way that a predetermined structured arrangement of the surface parts within said at least one independent surface element is not recognizable to the naked eye, said surface parts being occupied by a sub-structure which is selected from a group consisting of microscopically fine relief structures, structures with absorbent properties, structures with scattering properties, and a flat mirror, wherein microscopically fine relief structures of the surface parts differing in at least one of the grating parameters which include spatial frequency f and azimuth $\phi$, each of said sub-structures having one out of at least four states represented by a symmetric grating, asymmetric gratings with azimuths $\phi$ and $\phi+180$, by structure with absorbent properties, with scattering properties or a flat mirror, said surface parts of the surface element comprising at least two different sub-structures arranged into a cyclically permuting succession of the surface parts within said at least one independent surface element, and said surface element structured in said predetermined manner by a number of T surface parts, wherein the sub-structure for each of the T surface parts is one out of a number of Z=4 different sub-structures, representing, upon illumination of said surface element, an optically machine readable code of $E=Z^T$ different states; and
a plastic laminate in which the optically diffractive, microscopically fine relief structures, the plane mirror faces or the light absorbing or scattering structures of the N patterns and of said surface parts are embedded, the optical performance of which is determined by a reflection layer on the structures and the mirror faces, wherein the microscopically fine relief structures of the surface parts used in said surface element have at least one spatial frequency $f_B$ and the microscopically fine relief structures of said surface portions, which have an optical-diffraction effect, have spatial frequencies $f_R$ wherein no integral multiple of the spatial frequency $f_B$ is an integral multiple of one of the spatial frequencies $f_R$.

13. A surface pattern according to claim 12, wherein, within the surface element, areas occupied by the surface parts with the same sub-structure are of equal size.

14. A surface pattern according to claim 12, wherein each said at least one independent surface element is divided into surface parts in a form of pixels with at least one dimension smaller than 0.4 mm.

15. A surface pattern according to claim 12, wherein each said at least one independent surface element is divided into surface parts in a form of band-shaped surface parts with at least one dimension smaller than 0.4 mm.

16. A surface pattern according to claim 12, wherein the spatial frequency $f_B$ of at least one of the sub-structures having the microscopically fine relief structure is modulated and varies within a predetermined band with continuously.

17. A surface pattern according to claim 12, wherein the spatial frequency $f_B$ of at least one of the sub-structures having the microscopically fine relief structure is modulated and varies within a predetermined band width step-wise.

18. A surface pattern according to claim 12, wherein the spatial frequencies $f_B$ of said sub-structures containing a microscopically fine relief structure differ from the spatial frequencies $f_R$ used for the light-diffracting relief structures of the surface portions by a minimal spatial frequency distance $\pm \Delta f$ of about 20 to 100 lines per millimeter.

19. A surface pattern according to claim 12, wherein:
a plurality of surface elements of equal size form a linear surface formation, each said surface element being structured in said predetermined manner by a pair of surface parts having two out of at least five sub-structures;

a first two diffracting sub-structures are used to assign a bit of logic information to the surface element;

a next two diffracting sub-structures are used to indicate one of an even and odd surface element of the linear surface formation; and a fifth sub-structure, which is a planar mirror, is used to indicate one of a start and stop surface element, the pair of the surface parts is composed of one of the first two sub-structures with one of the remaining sub-structures.

20. A surface pattern according to claim 12, wherein in at least one of said at least one independent surface element, first surface parts are formed as a script image made from alpha-numerical characters or a line of text, while in second surface parts, other sub-structures serve as the background.

21. A surface pattern according to claim 12, wherein each said at least one independent surface element has a width of 0.5 mm and a height of 1.2 mm.

22. A surface pattern according to claim 12, wherein said at least one independent surface element being a plurality of surface elements that are not arranged in a juxtaposed order, but are dispersed within the N visually recognizable pattern.

23. A surface pattern according to claim 12, wherein said at least one independent surface element form at least one compact surface formation within the N visually recognizable pattern, and the compact surface formation has a form of a bounded area.

24. A surface pattern according to claim 12, wherein at least a graphical element of at least one of the N visually recognizable pattern extends over one of said at least one independent surface element dividing the surface element in sub-elements.

25. A surface pattern according to claim 12, wherein the plastic laminate is bonded to a document by means of an adhesive layer, and wherein said at least one independent surface element serves as an information element which is used for identifying the document in a reading machine.

26. A surface pattern comprising:

N visually recognizable patterns of surface portions having optically diffractive, microscopically fine relief structures, plane mirror faces or having light absorbing or scattering structures, the optical performance of which is determined by a reflection layer on the structures;

at least one independent surface element sharing the N patterns and located within the N patterns;

surface parts subdividing said surface element in such a way that a predetermined structured arrangement of the surface parts which is independent of the N patterns is not recognizable to the naked eye, and wherein each of the surface parts contains one of at least two different sub-structures that is a microscopically fine diffraction structure, a structure having light absorbing or scattering properties, or is a plane mirror; and a plastic laminate in which the optically diffractive, microscopically fine relief structures, the plane mirror faces or the light absorbing or scattering structures of the N patterns and of said surface parts are embedded, the optical performance of which is determined by a reflection layer on the structures and the mirror faces, wherein in each said at least one independent surface element, the microscopically fine diffraction structures of the surface parts have at least one spatial frequency $f_B$, and the optically diffractive, microscopically fine-relief structures of the N patterns have spatial frequencies $f_R$, and $k \cdot f_B \neq m \cdot f_R$ wherein k is the diffraction order of light diffracted by the surface parts to be detected in a reading machine and m is the order of diffraction of light diffracted by the N patterns.

27. The surface pattern according to claim 26, wherein said at least one independent surface element is an information element, wherein a plurality of surface elements form a surface formation within the N patterns, said surface elements are of equal size and are arranged linearly in a surface formation, and wherein each information element form a code which is optically readable by a reading machine.

28. The surface pattern according to claim 26, wherein spatial frequencies $f_B$ used in each said at least one independent surface element has at least a spatial-frequency difference $\Delta f$ of 20 to 100 lines per mm from any of the spatial frequencies $f_R$ of the diffracting structures of the N patterns.

29. The surface pattern according to claim 26, wherein spatial frequencies $f_B$ of each said at least one independent surface element has a predetermined bandwidth.

30. The surface pattern according to claim 26, wherein said surface element is subdivided by a multiplicity of the surface parts into pixels or bands, and a group of at least two diffracting sub-structures are assigned to the pixels or bands to form a cyclically alternating sequence.

31. The surface pattern according to claim 26, wherein said surface element is subdivided by pairs of the surface parts into pixels or bands, and the at least two different sub-structures of the surface parts are cyclically permuted.

32. The surface pattern according to claim 26, wherein at least one of the surface parts of said surface element is an alpha-numeric character or a line of text having a first sub-structure and is arranged on a background with a second sub-structure.

33. The surface pattern according to claim 26, wherein at least one of the N patterns comprises graphical elements and at least one of the graphical elements extends over said surface element and divides it into subelements.

34. The surface pattern according to claim 26, wherein the plastic laminate is bonded to a document by means of an adhesive layer, and wherein said at least one independent surface element serves as an information element which is used for identifying the document in a reading machine.

35. The surface pattern according to claim 26, wherein:

each said at least one independent surface element is used as an information element which is optically readable by a reading machine; and within each said at least one independent surface element, said surface parts having a same type sub-structure occupy an area, and areas of different sub-structures are of equal size.

36. The surface pattern according to claim 26, wherein each said at least one independent surface element is an information element, wherein a plurality of surface elements form a surface formation within the N patterns, and wherein each information element form a code which is optically readable by a reading machine.

37. A surface pattern, comprising:

N visually perceptible patterns including surface portions with structures which are comprised of at least microscopically fine relief structures selected from the group consisting of structures having an optical-diffraction effect, planar mirror surfaces, absorbent structures and scattering structures;

at least one independent surface element located within the N patterns which is not part of the N patterns;

surface parts subdividing said surface element in such a way that a predetermined structured arrangement of the surface parts is not recognizable to the naked eye, said surface parts being occupied by a sub-structure which is selected from a group consisting of microscopically fine relief structures, structures with absorbent properties, structures with scattering properties, and a flat mirror, wherein microscopically fine relief structures of the surface parts differing in at least one of the grating parameters which include spatial frequency f and azimuth $\phi$, each of said sub-structures having one out of at least four states represented by a symmetric grating, asymmetric gratings with azimuths $\phi$ and $\phi+180$, by structure with absorbent properties, with scattering properties or a flat mirror, said surface parts of the surface element comprising at least two different sub-structures arranged into a cyclically permuting succession of the surface parts, and said surface element structured in said predetermined manner by a number of T surface parts, wherein the sub-structure for each of the T surface parts is one out of a number of Z=4 different sub-structures, representing, upon illumination of said surface element, an optically machine readable code of $E=Z^T$ different states; and a plastic laminate in which the optically diffractive, microscopically fine relief structures, the plane mirror faces or the light absorbing or scattering structures of the N patterns and of said surface parts are embedded, the optical performance of which is determined by a reflection layer on the structures and the mirror faces, wherein the microscopically fine relief structures of the surface parts used in each said at least one independent surface element have at least one spatial frequency $f_B$ and the microscopically fine relief structures of said surface portions, which have an optical-diffraction effect, have spatial frequencies $f_R$, wherein no integral multiple of the spatial frequency $f_B$ is an integral multiple of one of the spatial frequencies $f_R$.

38. A surface pattern according to claim 37, wherein, within the surface element, areas occupied by the surface parts with the same sub-structure are of equal size.

39. A surface pattern according to claim 37, wherein each said at least one independent surface element is divided into surface parts in a form of pixels with at least one dimension smaller than 0.4 mm.

40. A surface pattern according to claim 37, wherein each said at least one independent surface element is divided into surface parts in a form of band-shaped surface parts with at least one dimension smaller than 0.4 mm.

41. A surface pattern according to claim 37, wherein the spatial frequency $f_B$ of at least one of the sub-structures having the microscopically fine relief structure is modulated and varies within a predetermined band width continuously.

42. A surface pattern according to claim 37, wherein the spatial frequency $f_B$ of at least one of the sub-structures having the microscopically fine relief structure is modulated and varies within a predetermined band width or step-wise.

43. A surface pattern according to claim 37, wherein:

a plurality of surface elements of equal size form a linear surface formation, each said surface element being structured in said predetermined manner by a pair of surface parts having two out of at least five sub-structures;

a first two diffracting sub-structures are used to assign a bit of logic information to the surface element;

a next two diffracting sub-structures are used to indicate one of an even and odd surface element of the linear surface formation; and a fifth sub-structure, which is a planar mirror, is used to indicate one of a start and stop surface element, the pair of the surface parts is composed of one of the first two sub-structures with one of the remaining sub-structures.

44. A surface pattern according to claim 37, wherein in at least one of said at least one independent surface element, first surface parts are formed as a script image made from alpha-numerical characters or a line of text, while in second surface parts, other sub-structures serve as the background.

45. A surface pattern according to claim 37, wherein each said at least one independent surface element has a width of 0.5 mm and a height of 1.2 mm.

46. A surface pattern according to claim 37, wherein said at least one independent surface element being a plurality of surface elements that are not arranged in a juxtaposed order, but are dispersed within the N visually recognizable pattern.

47. A surface pattern according to claim 37, wherein said at least one independent surface element form at least one compact surface formation within the N visually recognizable pattern, and the compact surface formation has a form of a bounded area.

48. A surface pattern according to claim 37, wherein at least a graphical element of at least one of the N visually recognizable pattern extends over one of said at least one independent surface element dividing the surface element in sub-elements.

49. A surface pattern according to claim 37, wherein the plastic laminate is bonded to a document by means of an adhesive layer, and wherein said at least one independent surface element serves as an information element which is used for identifying the document in a reading machine.

50. A surface pattern according to claim 37, wherein the spatial frequency $f_B$ of at least one of said sub-structures containing a microscopically fine relief structure differ from the spatial frequencies $f_R$ used for the light-diffracting relief structures of the surface portions by a minimal spatial frequency distance $\pm\Delta f$ of about 20 to 100 lines per millimeter.

* * * * *